United States Patent [19]

Inai et al.

[11] Patent Number: 5,041,335
[45] Date of Patent: Aug. 20, 1991

[54] UNDERCOAT COMPOSITION AND A METAL SUBSTRATE COATED WITH A RESIN COMPOSITION

[75] Inventors: Toshimi Inai; Koichi Karukaya, both of Takatsuki; Masao Ikeda, Nagaokakyo; Kazuyoshi Yamamoto, Osaka, all of Japan

[73] Assignee: Sekisui Kagaku Kogyo Kabushiki Kaisha, Osaka, Japan

[21] Appl. No.: 279,602

[22] Filed: Dec. 5, 1988

[30] Foreign Application Priority Data

May 2, 1988 [JP] Japan ................................ 63-109563
May 2, 1988 [JP] Japan ................................ 63-109564

[51] Int. Cl.$^5$ ............................................ B32B 27/08
[52] U.S. Cl. .................................... 428/416; 428/419; 428/458; 428/460; 525/471; 525/534; 525/535; 525/537; 525/906
[58] Field of Search ............... 428/419, 460, 416, 458; 525/471, 537

[56] References Cited

U.S. PATENT DOCUMENTS

| Re. 32,595 | 2/1988 | Davies | 428/419 |
| T952,005 | 11/1976 | Attwood et al. | 428/419 |
| 4,021,596 | 5/1977 | Bailey | 428/419 |
| 4,156,049 | 5/1979 | Hodes et al. | 428/419 |
| 4,167,605 | 9/1979 | Attwood et al. | 428/419 |

FOREIGN PATENT DOCUMENTS 323180  7/1989  European Pat. Off. ............ 428/460

*Primary Examiner*—John C. Bleutge
*Assistant Examiner*—David W. Woodward
*Attorney, Agent, or Firm*—Irell & Manella

[57] ABSTRACT

There are provided an undercoat composition with excellent adhesiveness to both a resin coating layer and a metal layer, and a metal substrate coated with a resin composition. The undercoat composition and the resin-coated metal substrate offer excellent hot-water resistance and chemical resistance.

7 Claims, No Drawings

UNDERCOAT COMPOSITION AND A METAL SUBSTRATE COATED WITH A RESIN COMPOSITION

BACKGROUND OF THE INVENTION

1. Field of the Invention

This invention relates to an undercoat composition with excellent adhesiveness to both a resin coating layer and a metal layer. It also relates to a metal substrate coated with a resin composition and more particularly to a resin-coated metal substrate with excellent hot-water resistance and chemical resistance.

2. Description of the Prior Art

Various metal substrates are coated with resin compositions to prevent rusting and to improve heat resistance and chemical resistance.

A polyaryletherketone resin and a polyphenylenesulfide resin are crystalline resins with excellent mechanical properties and chemical properties. Also, they have excellent heat resistance, water resistance, and corrosion resistance. Therefore, these resins are used as insulating materials for electric wires and cables, injection-molded articles, composites made of films or monofilaments, and the like. For example, Japanese Laid-open Patent Publication No. 56-92952 discloses a composition comprising a polyaryletherketone resin, glass, and/or a carbon reinforcing material. However, when these resins are used as a coating material for a metal substrate to obtain a non-crystalline resin coating layer formed on the metal substrate, water and chemical solutions are much diffused in the resin coating layer. Thus, when the resultant coated metal substrate comes into contact with water and chemical solutions, the resin coating layer is quite susceptible to the generation of blisters, and the coated metal substrate does not have satisfactory heat resistance or chemical resistance. Therefore, attempts have been made to cause these resins to be crystallized after their application to the metal substrate. In the resin coating layer containing the crystallized resins, water and chemical solutions are not much diffused. Therefore, the heat resistance and chemical resistance of the resultant coated metal substrate are improved. However, the resin coating layer is quite susceptible to cracking because of shrinkage thereof caused by the crystallization of the resin, resulting in poor impact resistance.

On the other hand, a polyarylethersulfone resin is excellent in heat resistance, chemical resistance, and workability, as well as in mechanical properties such as wear resistance and impact resistance. Also, the polyarylethersulfone resin is chemically stable in the range of from ordinary temperatures to the glass transition point. Moreover, because the polyarylethersulfone resin is a non-crystalline resin, when the polyarylethersulfone resin is used as a coating material for metal substrates, residual stress caused by the crystallization of the resin in the resultant coating layer does not occur.

Japanese Laid-Open Patent Publication No. 54-34335 discloses a powder coating method using a polyarylethersulfone resin. In this method, a resin coating layer formed on a metal substrate is treated at a given temperature and then baked, so that the adhesiveness of the resin coating layer to the metal substrate is improved. Therefore, the resin coating layer is relatively less susceptible to the generation of blisters and peeling in ordinary applications. However, because the polyarylethersulfone resin has relatively high water absorbing capacity, when the resultant coated metal substrate comes into contact with steam at a high temperature, the resin coating layer is quite susceptible to the generation of blisters and peeling.

Also, when resin compositions containing the above-mentioned resins are used for coating a metal substrate, the metal substrate is first treated by, for example, alkaline treatment to improve the adhesiveness of the resin coating layer to the metal substrate.

For the alkaline treatment, zinc phosphate and the like are used. However, the layer formed by the alkaline treatment does not have satisfactory heat resistance. Therefore, when the resin composition is used for coating the metal substrate that has been treated by alkaline treatment, and then the resin coating layer is baked, the layer formed by the alkaline treatment is degraded because of the application of heat. As a result, the adhesiveness of the resin coating layer to the metal substrate becomes poor.

To solve these problems, there has been proposed a method of coating a metal substrate with an undercoat composition. Japanese Patent Publication No. 59-44912 discloses various organic primers such as polyamide-imide resins and polyimide resins as undercoat compositions that are useful in coating a metal substrate with a fluororesin. However, these organic primers hardened in the step of baking do not have satisfactory adhesion to a resin coating layer formed thereon. Therefore, when the coated metal substrate obtained by undercoating a metal substrate with these organic primers comes into contact with steam at a high temperature, the adhesiveness of the resin coating layer to the metal substrate becomes poor.

As the undercoat composition, there are well-known mixtures of fine-powdered zinc and heat-stable binders such as polyalkylsilicates (disclosed in Japanese Laid-Open Patent Publication No. 49-128836) and compositions comprising powdered aluminium in granular form, powdered zinc in granular form, and the condensate of alkylsilicates (disclosed in Japanese Laid-Open Patent Publication No. 54-29340). An undercoat composition comprising polyalkylsilicates and powdered metal such as powdered aluminium provides relatively good adhesiveness to both a metal substrate and a resin coating layer made of a fluororesin or a polyphenylenesulfide resin. However, an undercoat layer containing an inorganic binder such as polyalkylsilicate does not have satisfactory adhesion to a resin coating layer. Therefore, when the resultant coated metal substrates obtained by the use of these undercoat compositions come into contact with steam at a high temperature, the adhesiveness of the resin coating layer to the metal substrate becomes poor.

SUMMARY OF THE INVENTION

The undercoat composition of this invention useful in coating a metal substrate with a resin composition, which overcomes the above-discussed and numerous other disadvantages and deficiencies of the prior art, comprises:

(a) at least one selected from a polyaryletherketone resin with a repeating unit of the following formula I, a polyaryletherketone resin with a repeating unit of the following formula II, and a polyphenylenesulfide resin with a repeating unit of the following formula III:

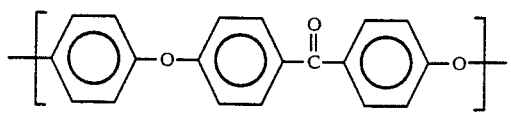

[I]

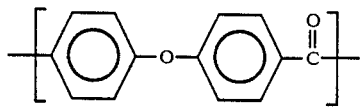

[II]

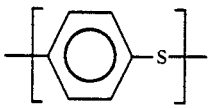

[III]

(b) a polyarylethersulfone resin with a repeating unit of the following formula IV and/or a polyarylethersulfone resin with a repeating unit of the following formula V:

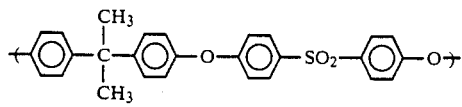

[IV]

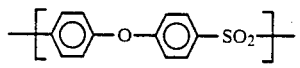

[V]

and (c) a thermosetting resin.

In a preferred embodiment, the ratio of the polyaryletherketone resin and/or the polyphenylenesulfide resin to the polyarylethersulfone resin is in the range of from 1:9 to 9:1 by weight.

In a preferred embodiment, the ratio of the polyarylethersulfone resin, and the polyaryletherketone resin and/or the polyphenylenesulfide resin to the thermosetting resin is in the range of from 1:9 to 9:1 by weight.

In a preferred embodiment, the thermosetting resin is at least one selected from the group consisting of imide resins or precursors thereof, epoxy resins, phenol resins, amide-imide resins or precursors thereof, and furan resins.

Also, the resin-coated metal substrate of this invention is obtained by coating a metal substrate with a resin composition comprising:

(a) at least one selected from a polyaryletherketone resin with a repeating unit of the following formula I, a polyaryletherketone resin with a repeating unit of the following formula II, and a polyphenylenesulfide resin with a repeating unit of the following formula III:

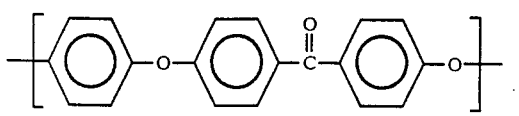

[I]

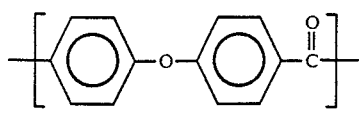

[II]

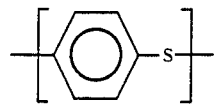

[III]

and (b) a polyarylethersulfone resin with a repeating unit of the following formula IV and/or a polyarylethersulfone resin with a repeating unit of the following formula V:

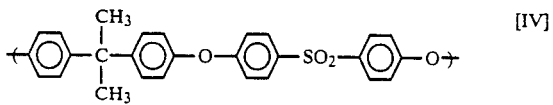

[IV]

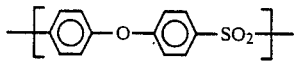

[V]

wherein the surface of the metal substrate is pretreated by undercoating or flame spraying.

In a preferred embodiment, the ratio of the polyaryletherketone resin and/or the polyphenylenesulfide resin to the polyarylethersulfone resin is in the range of from 1:9 to 9:1 by weight.

Thus, the invention described herein makes possible the objectives of (1) providing an undercoat composition with excellent adhesiveness to both a resin coating layer and a metal layer, and a metal substrate coated with a resin composition; and (2) providing a metal substrate coated with a resin composition and more particularly a coated metal substrate with excellent hot-water resistance and chemical resistance.

The undercoat composition of this invention is particularly useful for an undercoating agent to be used when a metal substrate such as an electric wire or a cable is coated with a resin composition comprising a polyarylethersulfone resin, and a polyaryletherketone resin and/or a polyphenylenesulfide resin; and for an undercoating agent for a metal substrate to be coated with a resin composition comprising a polyarylethersulfone resin, and a polyaryletherketone resin and/or a polyphenylenesulfide resin, these resins being used for coating vessels, pipes, and the like, which are required to offer heat resistance and chemical resistance. The coated metal substrate of this invention is preferably used for coating various components (for example, pipes through which acids and steam that contains acids are sent) of chemical plants and apparatus in the field of the chemical industry or food industry, which components are exposed to hot water, steam, and chemical solutions at high temperatures.

DESCRIPTION OF THE PREFERRED EMBODIMENTS

The polyaryletherketone resin that can be used for the undercoat composition and the coated metal substrate of this invention has a repeating unit of the following formula I or II; and the polyphenylenesulfide resin that can be used in this invention has a repeating unit of the following formula III:

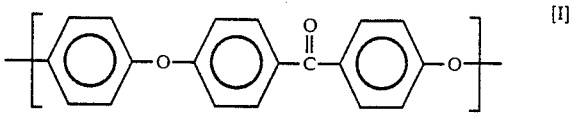

[I]

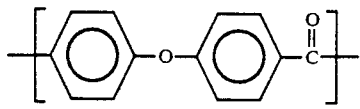

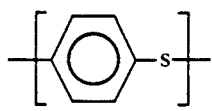

These resins can contain a small amount of copolymer units. The polyaryletherketone resins with a repeating unit of the formula I above include, for example, "Victrex PEEK" available from ICI Corp., which substance is a crystalline resin with a melting point (Tm) of 334° C., and a glass transition point (Tg) of 143° C. Also, the polyaryletherketone resins with a repeating unit of the formula II above include, for example, "Victrex PEK" available from ICI Corp., which substance is a crystalline resin with a melting point (Tm) of 365° C. and a glass transition point (Tg) of 165° C. The polyphenylenesulfide resins with a repeating unit of the formula III above include, for example, "Ryton P-6" available from Philips Corp., which substance is a crystalline resin with a melting point (Tm) of 280° C. and a glass transition point (Tg) of about 95° C.

The polyarylethersulfone resin that can be used in this invention has a repeating unit of the following formula IV or V:

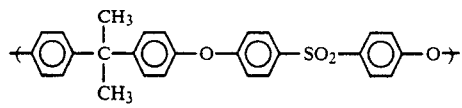

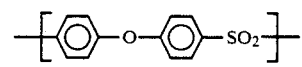

The polyarylethersulfone resin can contain a small amount of copolymer units. The polyarylethersulfone resins with a repeating unit of the formula IV above include, for example, "UDEL P-1800" available from AMOCO Performance Products Corp., which substance is a non-crystalline resin with a glass transition point (Tg) of about 190° C. The polyarylethersulfone resin preferably has reduced viscosity of from 0.3 to 0.6. The reduced viscosity can be found by measurement of the viscosity of the solution containing 1.0 g of a polyarylethersulfone resin in 100 ml of dimethylformamide at temperature of 25° C. Also, the polyarylethersulfone resins with a repeating unit of the formula IV above include, for example, "Victrex PES" available from ICI Corp.

The undercoat composition and the resin composition that is used for the resin-coated metal substrate of this invention contain a polyarylethersulfone resin, and a polyaryletherketone resin and/or a polyphenylenesulfide resin mentioned above. In this case, any one of the resins with a repeating unit of the formula I, II, or III may be used. A mixture of two or more of these resins may also be used. Similarly, either or both of the resins with a repeating unit of the formula IV or V can be used as the polyarylethersulfone resin. The ratio of the polyaryletherketone resin and/or the polyphenylenesulfide resin to the polyarylethersulfone resin is preferably in the range of from 1:9 to 9:1 by weight, and more preferably from 4:6 to 8:2. When an excess amount of polyaryletherketone resins and/or polyphenylenesulfide resins is contained in the undercoat composition or the resin composition, large residual stress will occur in the undercoat layer or the resin coating layer of the resulting coated metal substrate. Therefore, the adhesiveness of the undercoat layer or the resin coating layer to the metal substrate becomes poor because of generation of cracks in these layers. On the other hand, when an excess amount of polyarylethersulfone resins is contained in the undercoat composition or the resin composition, the undercoat composition and the resin composition have higher water absorbing capacity, so that the water resistance of the resultant coated metal substrate will be reduced.

The undercoat composition of this invention further contains a thermosetting resin in addition to the above-mentioned resins. The thermosetting resins that can be used include, for example, imide resins, epoxy resins, phenol resins, amide-imide resins, and furan resins. Particularly preferred are imide resins because of their high heat resistance. The imide resins include, for example, prepolymers comprising bismaleimide and diamine as polymer units; resin compositions comprising polyfunctional cyanate or a prepolymer of polyfunctional cyanate and amine, and bismaleimide or a prepolymer of bismaleimide and amine; imide prepolymers comprising polyfunctional amine, polyanhydride, nadic anhydride, and the like, as polymer units; and resin compositions comprising bismaleimide and alkenylphenol as polymer units.

When an excess amount of the thermosetting resins is contained in the undercoat composition of this invention, the adhesiveness of the undercoat layer to the resin coating layer will decrease. On the other hand, when a small amount of the thermosetting resins is contained in the undercoat composition of this invention, the adhesiveness of the undercoat layer to the metal substrate will decrease. Therefore, the ratio of the polyarylethersulfone resin, and the polyaryletherketone resin and/or the polyphenylenesulfide resin to the thermosetting resin is preferably in the range of from 1:9 to 9:1 by weight, and more preferably from 2:8 to 8:2. When the resin coating layer comprising a polyarylethersulfone resin, and a polyaryletherketone resin and/or a polyphenylsulfide resin is formed on the undercoat layer, it is desired that the ratio of the polyaryletherketone resin and/or the polyphenylsulfide resin to the polyarylethersulfone resin in the undercoat composition is approximately the same as the ratio of the polyaryletherketone resin and/or the polyphenylsulfide resin to the polyarylethersulfone resin in the resin coating layer because higher adhesiveness of the undercoat layer to the resin coating layer can thus be obtained.

The undercoat composition of this invention is applied to a metal substrate and baked to form an undercoat layer. Thus, the undercoat composition is usually used as a solution or dispersion in organic solvents. The organic solvents that can be used include, for example, N-methyl-2-pyrrolidone, dimethylacetoamide, and dimethylformamide.

On the other hand, the above-mentioned resin composition is applied to the surface of a metal substrate pretreated by undercoating or flame spraying to form the resin-coated metal substrate of this invention. Although various coating methods can be used to apply the resin composition, it is preferred that the resin composition mentioned above is applied to the surface of a metal substrate by powder coating and then baked. When the resin coating layer is thin, pinholes and cracks will readily occur. When the resin coating layer is thick, a fine layer cannot be obtained because of the evolution of bubbles. Also, it takes a long time to form a thick layer. Therefore, the thickness of the resin coating layer is preferably from 50 to 2000 μm, and more preferably from 250 to 1000 μm. Various methods can be used to mix a polyaryletherketone resin and/or a polyphenylsulfide resin with a polyarylethersulfone resin for the powder coating. For example, there can be mentioned the method in which these two resins are mixed together in the form of powder, the method in which these two resins are mixed by kneading to form pellets, followed by grinding of the pellets, and the like.

Optionally, the undercoat composition and the resin composition used for the coated metal substrate of this invention may contain an inorganic filler. The inorganic filler increases the thermal conductivity and the elastic modules of both the undercoat layer and the coating layer. Moreover, the inorganic filler reduces the internal residual stress of the undercoat layer and the coating layer. Therefore, the inorganic filler enhances the strength of the undercoat layer and the coating layer, which prevents these layers from being cracked because of shrinkage thereof caused by the crystallization of the resin.

The inorganic fillers that can be used include those with excellent water resistance and chemical resistance that are stable even at the high temperature of 400° C. Examples of inorganic fillers include metal, metal oxide, glass, carbon, ceramics, and the like. The metal includes, for example, aluminium, zinc, nickel alloy, stainless steel, and ferrous alloy. The metal oxide includes, for example, alumina, iron oxide, titanium oxide, zirconium oxide, chromium oxide, nickel oxide, and the like. Also included is potassium titanate. The ceramics include, in addition to those included in the metal oxides mentioned above, silicon nitride, titanium nitride, boron carbide, silicon carbide, and the like.

The inorganic filler is preferably contained as a fine powder in the form of fibers, granules, or flakes. When the inorganic filler is contained in the undercoat composition, the mean particle size of those powders is adjusted to from 1 to 100 μm, and preferably from 5 to 30 μm. Also, the inorganic filler is preferably used in an amount of from 10 to 800 parts by weight, and more preferably from 25 to 400 parts by weight for 100 parts by weight of the resin components contained in the undercoat composition. When less than 10 parts by weight of the inorganic filler is added to the undercoat composition, the inorganic filler is not effective in the composition. When more than 800 parts by weight of the inorganic filler is added to the undercoat composition, the adhesiveness of the undercoat composition is insufficient, resulting in poor adhesion of the resin coating layer to the metal substrate via the undercoat layer. On the other hand, the inorganic filler is contained in the resin composition used for the coated metal substrate in amount of 40 percent by weight or less, and preferably 10 to 30 by weight based on the weight of the resin composition. When more than 40 percent by weight of the inorganic filler is added to the resin composition, the adhesiveness of the inorganic filler to the resin components in the coating layer decreases, resulting in poor adhesion of the resin coating layer to the metal substrate.

The metal substrates that can be used for the coated metal substrate of this invention include metals such as iron and aluminium and alloys such as stainless steel. The metal substrate is not limited to a particular form, but can be used in the form of a plate, a tube, or the like, or in an irregular form.

When the coated metal substrate of this invention is prepared, the surface of the metal substrate to be coated is first treated by an appropriate pretreatment such as sandblasting, degreasing, or alkaline treatment. The surface of the metal substrate is then treated by undercoating with an undercoat composition or by flame spraying of a metallic material. When the metal substrate is treated by undercoating, the undercoat composition used is dissolved in an organic solvent such as N-methyl-2-pyrrolidone, dimethylacetoamide, and dimethylformamide and applied to the surface and the inside face of the metal substrate. Then, the applied face of the metal substrate is baked to form an undercoat layer. The baking temperature is preferably in the range of from 150° to 250° C. The thickness of the undercoat layer is preferably in the range of from 5 to 100 μm, and more preferably from 10 to 30 μm. When the thickness of the undercoat layer is less than 5 μm, the undercoat layer cannot be formed uniformly, so that pinholes and cracks will readily occur. When the thickness of the undercoat layer is more than 100 μm, the adhesiveness of the undercoat layer to the metal substrate becomes poor.

On the other hand, when the metal substrate is pretreated by flame spraying, the materials that can be used for the flame spraying include metals, ceramics, and the like. Particularly preferred are metals because the adhesiveness of the resin coating layer to the metal substrate may be improved by their use. The metals that can be used for flame spraying include nickel alloys, stainless steel, cast iron, aluminium, zinc, and the like. A flame-sprayed layer is formed by arc spray coating or plasma spray coating. The thickness of the flame-sprayed layer is preferably from 20 to 200 μm, and more preferably from 30 to 80 μm. When the thickness of the flame-sprayed layer is less than 20 μm, the flame-sprayed layer cannot be formed uniformly, so that pinholes will readily occur. When the thickness of the flame sprayed layer is more than 200 μm, the adhesiveness of the flame-sprayed layer to the metal substrate becomes poor.

A coating layer made of the resin composition is formed on the surface of the metal substrate that has been pretreated as described above. The resin composition contains the polyarylethersulfone resin, and the polyaryletherketone resin and/or the polyphenylsulfide resin, and optionally, the resin composition contains the inorganic filler mentioned above. For example, the coating layer is formed as follows: The resin composition mentioned above is dissolved in an appropriate organic solvent such as N-methyl-2-pyrrolidone, dimethylacetoamide, or dimethylformamide to obtain a solution or emulsion. The solution or emulsion is applied to the surface of the pretreated metal substrate, followed by baking at a temperature of around 400° C. The resin composition is also applicable in the form of a powder instead of a solution or emulsion.

The thickness of the coating layer is preferably in the range of from 50 to 2000 μm, and more preferably from 250 to 1000 μm. When the thickness of the coating layer is less than 50 μm, the coating layer cannot be formed uniformly, so that pinholes and cracks will readily occur. When the thickness of the coating layer is more than 2000 μm, a fine coating layer cannot be formed because of foaming. Also, it takes a long time to bake such a thick layer.

The coated metal substrate provided with the coating layer made of the resin composition mentioned above is allowed to cool down or is cooled rapidly, and is then treated by the application of heat at an appropriate temperature, resulting in the resin-coated metal substrate of this invention.

In the coating layer of the resin-coated metal substrate of this invention, residual stress caused by the crystallization of the polyaryletherketone resin or the polyphenylsulfide resin will be reduced by the use of the polyarylethersulfone resin. Also, the water-absorbing capacity of the polyarylethersulfone resin will be improved by the use of the polyaryletherketone resin or the polyphenylsulfide resin. Therefore, the coating layer has both the chemical and mechanical properties of these resins.

EXAMPLE 1.1

(A) Preparation of Undercoat Composition

First, 3.222 g of 3,3',4,4'-benzophenone-tetra-carboxylic dianhydride, 2.974 g of 3,3'-methylene-dianiline, and 1.642 g of 5-norbornene-2,3-dicarboxylic anhydride were dissolved in 30 g of N-methyl-2-pyrrolidone that had been dried by use of a molecular sieve. This solution was stirred for 6 hours at ordinary temperatures to obtain a solution of imido oligomer (i.e., a thermosetting resin).

To the solution of the thermosetting resin, 3.9 g of polyaryletherketone resin (Victrex PEEK 15/F, ICI Corp.) of fine powder with the mean particle size of about 10 to 20 μm that was obtained by freeze-grinding, and 3.9 g of polyarylethersulfone resin (UDEL P-1800, AMOCO Performance Products Corp.) with the mean particle size of about 10 to 20 μm that was obtained by freeze-grinding were added and mixed to homogeneity to obtain an undercoat composition.

(B) Formation of Undercoating Layer

An iron plate (100 mm × 100 mm × 3 mm) was treated by grit blasting and cleaned by use of a compressed air. After the undercoat composition obtained was coated on this plate with a brush, the plate was dried and baked for 30 minutes at the temperature of 250° C. The resulting undercoating layer was 25 μm thick, on the average.

(C) Formation of Coating Layer

Eighty grams of polyaryletherketone resin (Victrex PEEK 15/F, ICI Corp.) of fine powder with the mean particle size of about 10 to 20 μm that was obtained by freeze-grinding, 80 g of polyarylethersulfone resin (UDEL P-1800, AMOCO Performance Products Corp.) of fine powder with the mean particle size of about 10 to 20 μm that was obtained by freeze-grinding, and 40 g of powdered glass fibers (mean particle diameter, about 9 μm; length, about 15 to 100 μm) were mixed to obtain a powderous resin composition.

After the undercoated iron plate obtained in section B was baked for 30 minutes at the temperature of 400° C., a coating layer was formed by the powder-coating of the resin composition mentioned above four times onto the undercoating layer at an electrostatic voltage of 60 KV. For each powder-coating, heating was carried out for 5 minutes at the temperature of 400° C. to spread the resin composition over the surface. The iron plate coated by the resin composition was cooled rapidly in water, and then heated for 1 hour at the temperature of 200° C. The resulting coating layer was 500 μm thick, on the average.

(D) Evaluation of Coated Metal Substrate

The resulting coated iron plate obtained in section C was evaluated by the following procedure. The results are shown in Table 1.

(1) Hot water test

The coated metal plate was immersed into hot water for 100 hours, so that the resin-coated side was kept at 95° C. and the iron plate side (the side not coated with the resin) was kept at 65° C. The resin-coated layer was evaluated visually.

(2) Steam test

After the coated metal plate was kept for 200 hours in an autoclave filled with steam at 150° C., the coating layer was evaluated visually.

In Table 1, the degree of blistering is shown in terms of the blistered area as a percentage of the total area of the coating layer.

EXAMPLE 1.2

A resin-coated metal substrate was obtained by the procedure of Example 1.1 except that 4.7 g of polyaryletherketone resin and 3.1 g of polyarylethersulfone resin were used in the preparation of the undercoat composition. The coated metal substrate was evaluated by the hot water test and the steam test of Example 1.1. The results are shown in Table 1.

EXAMPLE 1.3

A resin-coated metal substrate was obtained by the procedure of Example 1.1 except that 20 g of N-methyl-2-pyrrolidone was used in the preparation of the undercoat composition. The coated metal substrate was evaluated by the hot water test and the steam test of Example 1.1. The results are shown in Table 1.

EXAMPLE 1.4

First, 5 g of aminobismaleimide resin (KERIMID 601, Loire Puran Corp.) was dissolved in 15 g of N-methyl-2-pyrrolidone. To the solution, 2 g of polyaryletherketone resin of Example 1.1, 2 g of polyarylethersulfone resin of Example 1.1, 15 g of SUS 316 stainless steel powder (mean particle diameter, 40 μm or less) were added and mixed to homogeneity to obtain an undercoat composition. A resin-coated metal substrate was obtained by the procedure of Example 1.1 except that this undercoat composition was used in the preparation of the undercoat composition. The coated metal substrate was evaluated by the hot water test and the steam test of Example 1.1. The results are shown in Table 1.

EXAMPLE 1.5

A resin-coated metal substrate was obtained by the procedure of Example 1.1 except that 30 g of powdered carbon fibers (mean diameter; about 7.5 μm; length of fiber; about 20 to 100 μm) was used instead of 40 g of the powdered glass fibers, and that 96 g of polyaryletherketone resin and 64 g of polyarylethersulfone resin were used in the formation of the coating layer. The coated metal substrate was evaluated by the hot water test and the steam test of Example 1.1. The results are shown in Table 1.

EXAMPLE 1.6

A resin-coated metal substrate was obtained by the procedure of Example 1.1 except that polyaryletherketone resin (Victrex PEK, ICI Corp.) in a fine powder with the mean particle size or about 10 to 20 μm that was obtained by freeze-grinding was used instead of the polyaryletherketone resin of Example 1.1 in the preparation of the undercoat composition and the iron plate coated with the resin composition was heated for 1 hour at the temperature of 210° C. after being cooled in water instead of at 200° C. in the formation of coating layer. The coated metal substrate was evaluated by the hot water test and the steam test of Example 1.1. The results are shown in Table 1.

EXAMPLE 2.1

The procedure of Example 1.1 was repeated except that 3.9 g of polyaryletherketone was used in that undercoat composition; that Victrex PES 5003P (ICI Corp.) was used as the polyarylethersulfone resin in undercoat composition and in the resin composition; that 31.2 g of SUS316 powder (mean particle diameter 40 μm or less) was added to the undercoat composition; and that the steam test was carried out at 170° C. The results are shown in Table 1.

EXAMPLE 2.2

A resin-coated metal substrate was obtained by the procedure of Example 2.1 except that 4.7 g of polyaryletherketone resin and 3.1 g of polyarylethersulfone resin were used in the preparation of the undercoat composition. The coated metal substrate was evaluated by the hot water test and the steam test of Example 1.1. The results are shown in Table 1.

EXAMPLE 2.3

A resin-coated metal substrate was obtained by the procedure of Example 2.1 except that 20 g of N-methyl-2-pyrrolidone was used in the preparation of the undercoat composition. The coated metal substrate was evaluated by the hot water test and the steam test of Example 1.1. The results are shown in Table 1.

EXAMPLE 2.4

First, 5 g of aminobismaleimide resin (KERIMID 601, Loire Puran Corp.) was dissolved in 15 g of N-methyl-2-pyrrolidone. To the solution, 2 g of polyaryletherketone resin of Example 2.1, 2 g of polyarylethersulfone resin of Example 2.1, 15 g of SUS 316 stainless steel powder (mean particle diameter, 40 μm or less) were added, and mixed to homogeneity to obtain an undercoat composition. A resin-coated metal substrate was obtained by the procedure of Example 2.1 except that this undercoat composition was used in the preparation of the undercoat composition. The coated metal substrate was evaluated by the hot water test and the steam test of Example 1.1. The results are shown in Table 1.

EXAMPLE 2.5

A resin-coated metal substrate was obtained by the procedure of Example 2.1 except that 30 g of powdered carbon fibers (mean diameter; about 7.5 μm; length of fiber; about 30 to 100 μm) was used instead of 40 g of the powdered glass fibers, and that 96 g of polyaryletherketone resin and 64 g of polyarylethersulfone resin were used in the formation of the coating layer. The coated metal substrate was evaluated by the hot water test and the steam test of Example 1.1. The results are shown in Table 1.

EXAMPLE 2.6

A resin-coated metal substrate was obtained by the procedure of Example 2.1 except that polyaryletherketone resin (Victrex PEK, ICI Corp.) in a fine powder with the mean particle size of about 10 to 20 μm that was obtained by freeze-grinding was used instead of the polyaryletherketone resin of Example 2.1 in the preparation of the undercoat composition and the iron plate coated with the resin composition was heated for 1 hour at the temperature of 210° C. after being cooled in water instead of at 200° C. in the formation of coating layer. The coated metal substrate was evaluated by the hot water test and the steam test of Example 1.1. The results are shown in Table 1.

TABLE 1

| | Hot water test | Steam test |
| --- | --- | --- |
| Example 1.1 | blistering and peeling not observed | blistering and peeling not observed |
| Example 1.2 | blistering and peeling not observed | blistering and peeling not observed |
| Example 1.3 | blistering and peeling not observed | blistering and peeling not observed |
| Example 1.4 | blistering and peeling not observed | blistering and peeling not observed |
| Example 1.5 | blistering and peeling not observed | blistering and peeling not observed |
| Example 1.6 | blistering and peeling not observed | blistering and peeling not observed |
| Example 2.1 | blistering and peeling not observed | blistering and peeling not observed |
| Example 2.2 | blistering and peeling not observed | blistering and peeling not observed |
| Example 2.3 | blistering and peeling not observed | blistering and peeling not observed |
| Example 2.4 | blistering and peeling not observed | blistering and peeling not observed |
| Example 2.5 | blistering and peeling not observed | blistering and peeling not observed |
| Example 2.6 | blistering and peeling not observed | blistering and peeling not observed |

EXAMPLE 3.1

(A) Preparation of Undercoat Composition

First 3.222 g of 3,3',4,4'-benzophenonetetracarboxylic anhydride, 3.725 g of 3,3'-diaminodiphenylsulfone, and 1.642 g of 5-norbornene-2,3,-dicarboxylic anhydride were dissolved in 30 g of N-methyl-2-pyrrolidone that had been dried by use of a molecular sieve. This solution was stirred for 6 hours at ordinary temperatures to obtain a solution of imido oligomer (i.e., a thermosetting resin). To the solution of the thermosetting resin, 4.2 g of polyaryletherketone resin (Victrx PEEK 15/F, ICI Corp.) of fine powder with the mean particle size of about 10 to 20 μm that was obtained by freeze-grinding, 4.2 g of polyarylethersulfone resin (UDEL P-1800, AMOCO Performance Products Corp.) with the mean particle size of about 10 to 20 μm that was obtained by freeze-grinding, and 25.8 g of SUS 316 powder (mean particle diameter, 40 μm or less) were added and mixed to homogeneity to obtain an undercoat composition.

(B) Formation of Undercoating Layer

The procedure of Example 1.1, section B was repeated.

(C) Formation of Coating Layer

The procedure of Example 1.1, section C was repeated.

(D) Evaluation of Coated Metal Substrate

The procedure of Example 1.1, section D was repeated except that the time used for the steam test was 150 hours. The results are shown in Table 2.

EXAMPLE 3.2

A resin-coated metal substrate was obtained by the procedure of Example 3.1 except that 100 g of polyaryletherketone resin and 60 g of polyarylethersulfone resin were used in the resin composition in the formation of the coating layer. The coated metal substrate was evaluated by the hot water test and the steam test of Example 1.1. The results are shown in Table 2.

EXAMPLE 3.3

A resin-coated metal substrate was obtained by the procedure of Example 3.1 except that 30 g of powdered carbon fiber (mean particle diameter, about 7.5 μm; length of fiber, about 20 to 100 μm) was used instead of 40 g of the glass powder in the resin composition in the formation of the coating layer. The coated metal substrate was evaluated by the hot water test and the steam test of Example 1.1. The results are shown in Table 2.

EXAMPLE 3.4

A resin-coated metal substrate was obtained by the procedure of Example 3.1 except that 160 g of a powder with the mean particle diameter of 10 to 20 μm was used instead of the polyaryletherketone resin and the polyarylethersulfone resin of Example 3.1 in the undercoat composition and the resin composition. This powder was prepared by melting and kneading an equal amount of the polyaryletherketone resin and polyarylethersulfone resin of Example 3.1 at the temperature of 400° C. to make pellete, and freeze-grinding of the pellets. The coated metal substrate was evaluated by the hot water test and the steam test of Example 1. The results are shown in Table 2.

EXAMPLE 3.5

A resin-coated metal substrate was obtained by the procedure of Example 3.1 except that polyaryletherketone resin (Victrex PEK, ICI Corp.) of a fine powder with the mean particle diameter of about 10 to 20 μm that was obtained by freeze-grinding was used in the undercoat composition and the resin composition instead of the polyaryletherketone resin of Example 3.1, and that the iron plate coated with the resin composition was heated for 1 hour at the temperature of 210° C. after being cooled in water instead of at 200° C. during the formation of the coating layer. The coated metal substrate was evaluated by the hot water test and the steam test of Example 1.1. The results are shown in Table 2.

EXAMPLE 3.6

To a solution of 5 g of aminobismaleimide (KERIMID 601; Loire Puran Corp.) in 15 g of N-methyl-2-pyrrolidone, 15 g of SUS 316 stainless steel powder (mean particle diameter, 40 μm or less) was added, and mixed to homogeneity to obtain an undercoat composition.

A resin-coated metal substrate was obtained by the procedure of Example 3.1 by use of the above-mentioned undercoat composition. The coated metal substrate was evaluated by the hot water test and the steam test of Example 1.1. The results are shown in Table 2.

EXAMPLE 3.7

One hundred grams of Ethylsilicate #40 (a solution containing a condensate of five molecules of ethyl silicate; the amount of ethyl silicate in terms of $SiO_2$ was 40% by weight) and 40 g of ethyl alcohol were put in a glass vessel, and a solution of 1 g of 1N HCl and 9 g of water was added dropwise over 2 hours with stirring of the reaction mixture. The reaction mixture was stirred for an additional 3 hours, and left for 20 hours, resulting in a solution that contained a condensate of ethyl silicate. This reaction mixture contained 50% of ethyl silicate condensate.

An undercoat composition was obtained by adding 30 g of aluminium powder (mean particle diameter, 40 μm or less) and 5 g of butylcellosolve to 15 g of the solution of ethyl silicate condensate, and mixing of the solution to homogeneity. A resin-coated metal substrate was obtained by the procedure of Example 1.1 except that this undercoat composition was used in the formation of the undercoating layer. The coated metal substrate was evaluated by the hot water test and the steam test of Example 1.1. The results are shown in Table 2.

EXAMPLE 3.8

After a flame spraying layer 50 to 60 μm thick comprising SUS 306 was formed by the arc spray coating of SUS 306 on a steel plate treated by grit blast, a resin-coated metal substrate was prepared by coating of the resin composition on the flame spraying layer according to the procedure of Example 3.1. The coated metal substrate was evaluated by the hot water test and the steam test of Example 1.1. The results are shown in Table 2.

COMPARATIVE EXAMPLE 1

A resin-coated metal substrate was obtained by the procedure of Example 3.1 except that 160 g or polyarylethersulfone resin was used instead of 80 g of polyaryletherketone resin and 80 g of polyarylethersulfone resin in the resin composition. The coated metal substrate was evaluated by the hot water test and the steam test of Example 1.1. The results are shown in Table 2.

COMPARATIVE EXAMPLE 2

A resin-coated metal substrate was obtained by the procedure of Example 3.1 except that 160 g of polyaryletherketone resin was used instead of 80 g of polyaryletherketone resin and 80 g of polyarylethersulfone resin in the resin composition. The coated metal substrate was evaluated by the hot water test and the steam test of Example 1.1. The results are shown in Table 2.

EXAMPLE 4.1

The procedure of Example 3.1 was repeated except that 80 g of Victrex PES (ICI Corp.) was used as polyarylsulfone resin in the resin composition, and that the steam test was carried out at 170° C. The results are shown in Table 2.

EXAMPLE 4.2

A resin-coated metal substrate was obtained by the procedure of Example 4.1 except that 100 g of polyaryletherketone resin and 60 g of polyarylethersulfone resin were used in the resin composition in the formation of the coating layer. The coated metal substrate was evaluated by the hot water test and the steam test of Example 1.1. The results are shown in Table 2.

EXAMPLE 4.3

A resin-coated metal substrate was obtained by the procedure of Example 4.1 except that 30 g of powdered carbon fiber (mean particle diameter, about 7.5 μm; length of fiber, about 20 to 100 μm) was used instead of 40 g of the glass powder in the resin composition in the formation of the coating layer. The coated metal substrate was evaluated by the hot water test and the steam test of Example 1.1. The results are shown in Table 2.

EXAMPLE 4.4

A resin-coated metal substrate was obtained by the procedure of Example 1.1 except that 160 g of a powder with the mean particle diameter of 10 to 20 μm was used instead of the polyaryletherketone resin and the polyarylethersulfone resin of Example 4.1 in the undercoat composition and the resin composition. This powder was prepared by melting and kneading an equal amount of the polyaryletherketone resin and polyarylethersulfone resin of Example 4.1 at the temperature of 400° C. to make pellete, and freeze-grinding of the pellets. The coated metal substrate was evaluated by the hot water test and the steam test of Example 1.1. The results are shown in Table 2.

EXAMPLE 4.5

A resin-coated metal substrate was obtained by the procedure of Example 4.1 except that polyaryletherketone resin (Victrex PEK, ICI Corp.) of a fine powder with the mean particle diameter of about 10 to 20 μm that was obtained by freeze-grinding was used in the undercoat composition and the resin composition instead of the polyaryletherketone resin of Example 4.1, and that the iron plate coated with the resin composition was heated for 1 hour at the temperature of 210° C. after being cooled in water instead at 200° C. during the formation of the coating layer. The coated metal substrate was evaluated by the hot water test and the steam test of Example 1.1. The results are shown in Table 2.

EXAMPLE 4.6

To a solution of 5 g of aminobismaleimide (KERIMID 601, Loire Puran Corp.) in 15 g of N-methyl-2-pyrrolidone, 15 g of SUS 316 stainless steel powder (mean particle diameter, 40 μm or less) was added, and mixed to homogeneity to obtain an undercoat composition.

A resin-coated metal substrate was obtained by the procedure of Example 4.1 by use of the above-mentioned undercoat composition. The coated metal substrate was evaluated by the hot water test and the steam test of Example 1.1. The results are shown in Table 2.

EXAMPLE 4.7

One hundred grams of Ethylsilicate #40 (a solution containing a condensate of five molecules of ethyl silicate; the amount of ethyl silicate in terms of $SiO_2$ was 40% by weight) and 40 g of ethyl alcohol were put in a glass vessel, and a solution of 1 g of 1N HCl and 9 g of water was added dropwise over 2 hours with stirring of the reaction mixture. The reaction mixture was stirred for an additional 3 hours, and left for 20 hours, resulting in a solution that contained a condensate of ethyl silicate. This reaction mixture contained 50% of ethyl silicate condensate.

An undercoat composition was obtained by adding 30 g of aluminium powder (mean particle diameter, 40 μm or less) and 5 g of butylcellosolve to 15 g of the solution of ethyl silicate condensate, and mixing of the solution to homogeneity. A resin-coated metal substrate was obtained by the procedure of Example 4.1 except that this undercoat composition was used in the formation of the undercoating layer. The coated metal substrate was evaluated by the hot water test and the steam test of Example 1.1. The results are shown in Table 2.

EXAMPLE 4.8

After a flame spraying layer 50 to 60 μm thick comprising SUS 306 was formed by the arc spray coating of SUS 306 on a steel plate treated by grit blast, a resin-coated metal substrate was prepared by coating of the resin composition on the flame spraying layer according to the procedure of Example 3.1. The coated metal substrate was evaluated by the hot water test and the steam test of Example 1.1. The results are shown in Table 2.

COMPARATIVE EXAMPLE 3

A resin-coated metal substrate was obtained by the procedure of Example 4.1 except that 160 g of polyarylethersulfone resin was used instead of 80 g of polyaryletherketone resin and 80 g of polyarylethersulfone resin in the resin composition. The coated metal substrate was evaluated by the hot water test and the steam test of Example 1.1. The results are shown in Table 2.

TABLE 2

| | Hot water test | Steam test |
|---|---|---|
| Example 3.1 | blistering and peeling not observed | blistering and peeling not observed |
| Example 3.2 | blistering and peeling not observed | blistering and peeling not observed |
| Example 3.3 | blistering and peeling not observed | blistering and peeling not observed |
| Example 3.4 | blistering and peeling not observed | blistering and peeling not observed |
| Example 3.5 | blistering and peeling not observed | blistering and peeling not observed |
| Example 3.6 | blistering and peeling not observed | blistering of 10% of the surface |
| Example 3.7 | blistering and peeling not observed | peeling in areas |
| Example 3.8 | blistering and peeling not observed | blistering of 10% of the surface |
| Comparative Example 1 | blistering of entire surface | peeling of entire surface |
| Comparative Example 2 | blistering and peeling not observed | cracking and peeling off in areas |
| Example 4.1 | blistering and peeling not observed | blistering and peeling not observed |
| Example 4.2 | blistering and peeling not observed | blistering and peeling not observed |
| Example 4.3 | blistering and peeling not observed | blistering and peeling not observed |
| Example 4.4 | blistering and peeling not observed | blistering and peeling not observed |
| Example 4.5 | blistering and peeling not observed | blistering and peeling not observed |
| Example 4.6 | blistering and | blistering and |

TABLE 2-continued

| | Hot water test | Steam test |
|---|---|---|
| Example 4.7 | peeling not observed blistering and peeling not observed | peeling not observed peeling in areas |
| Example 4.8 | blistering and peeling not observed | blistering of 5% of the surface |
| Comparative Example 3 | blistering of entire surface | peeling of entire surface |

EXAMPLE 5.1

(A) Preparation of Undercoat Composition

First, 3.222 g of 3,3',4,4'-benzophenonetetra carboxylic anhydride, 3.725 g of 3,3'-diaminodiphenylsulfone, and 1.642 g of 5-norbornene-2,3-dicarboxylic anhydride were dissolved in 30 g of N-methyl-2-pyrrolidone that had been dried by use of a molecular sieve. This solution was stirred for 6 hours at ordinary temperatures to obtain a solution of imido oligomer (i.e., a thermosetting resin). To this solution, 25.8 g of SUS 304 stainless steel powder (mean particle diameter, 40 μm or less), 4.2 g of polyphenylenesulfide resin (Ryton P-6; Philips Co.), and polyarylethersulfone resin (Victrex PES 5003P; ICI Corp.) were added and mixed to homogeneity, resulting in an undercoat composition.

(B) Formation of Undercoating Layer

The procedure of Example 1.1, section B was repeated using the undercoat composition obtained in this Example, section A.

(C) Formation of Coating Layer

Eighty grams of polyphenylenesulfide resin (Ryton P-6; Philips Co.) of a fine powder with the mean particle diameter of about 10 to 20 μm that was obtained by freeze-grinding, 80 g of polyarylethersulfone resin (Victrex PES 5003P; ICI Corp.) of a fine powder with the mean particle diameter of about 10 to 20 μm that was obtained by freeze-grinding, and 40 g of powdered glass fibers (mean particle diameter, about 9 μm; length, about 15 to 100 μm) were mixed to obtain a powderous resin composition.

After the undercoated iron plate obtained in section B was baked for 30 minutes at the temperature of 400° C., a coating layer was formed by the powder-coating of the resin composition mentioned above four times on the undercoating layer at the electrostatic voltage of 60 KV. For each powder-coating, heating was carried out for 5 minutes at the temperature of 400° C. to spread the resin composition over the surface. The iron plate coated by the resin composition was cooled rapidly in water and heated for 1 hour at the temperature of 200° C. The resulting coating layer was 500 μm thick, on the average.

(D) Evaluation of Coated Metal Substrate

The resulting coated iron plate obtained in section C mentioned above was evaluated by the following procedure. The results are shown in Table 3. The results obtained in Examples 5.2 to 5.10 and Comparative Examples 4–7 are also shown in Table 3.

(1) Adhesion-strength test

A knife was used to make inoisions in a checkerboard pattern in the coating layer with 1-mm spacing down to the metal substrate of the resin-coated metal substrate, after which the coating layer was observed.

(2) Steam test

After the coated metal plate was kept for 100 hours in an autoclave filled with steam at 120° C., the coating layer was evaluated visually.

EXAMPLE 5.2

The procedure of Example 5.1 was repeated except that 100 g of polyphenylenesulfide (PPS) and 60 g of polyethersulfone (PES) were used.

EXAMPLE 5.3

One kilogram of PPS and 1 kg of PES were melted and kneaded in a kneading machine at 400° C., resulting in pellets. The pellets were frozen and ground to fine particles with a diameter of 10 to 20 μm. The procedure of Example 5.1 was repeated except that 160 g of the resin powder that was obtained above was used instead of PPS and PES in the resin composition.

EXAMPLE 5.4

An undercoat composition was obtained by dissolving 5 g of aminobismaleimide (KERIMID 601, Loire Puran Corp.) in 15 g of N-methyl-2-pyrrolidone and adding 30 g of SUS 304 stainless steel powder, 7.5 g of PPS and 7.5 g of PES to the solution. A resin-coated metal substrate was obtained by the procedure of Example 5.1 except that this undercoat composition was used in the preparation of the undercoating layer.

EXAMPLE 5.5

The procedure of Example 5.1 was repeated except that the powdered glass fibers were not used in the resin composition.

EXAMPLE 5.6

The procedure of Example 5.1 was repeated except that 30 g of powdered carbon fiber (mean particle diameter, about 7.5 μm; fiber length, 20 to 100 μm) was used instead of 40 g of the glass powder in the resin composition.

EXAMPLE 5.7

The procedure of Example 5.1 was repeated except that polysulfone (PSF; Udelpolysulfone; Union Carbide Co.) in a fine powder obtained by freeze-grinding was used as the polyarylethersulfone, and that the iron plate coated with the resin composition being heated for 1 hour at the temperature of 170° C. after being cooled in water instead of at 200° C. in the formation of the coating layer.

EXAMPLE 5.8

After a flame spraying layer 50 to 60 μm thick comprising SUS 306 was formed by the arc spray coating of SUS 306 on a steel plate treated by grit blast, a resin-coated metal substrate was prepared by coating the resin composition on the flame spraying layer according to the procedure of Example 5.1.

COMPARATIVE EXAMPLE 4

The procedure of Example 5.1 was repeated except that PPS was not used, and that 160 g of PES was used in the resin composition.

COMPARATIVE EXAMPLE 5

The procedure of Example 5.1 was repeated except that polyarylsulfone was not used, and that 160 g of PPS was used in the resin composition.

COMPARATIVE EXAMPLE 6

The procedure of Example 5.1 was repeated except that PPS was not used, and that 160 g of polysulfone (PSF) was used in the resin composition.

COMPARATIVE EXAMPLE 7

The procedure of Example 5.1 was repeated except that the cleaned iron plate was treated by a phosphate solution in the formation of the undercoating layer.

TABLE 3

| | Adhesion-Strength Test | Steam Test |
|---|---|---|
| Example 5.1 | no peeling | blistering and peeling not observed |
| Example 5.2 | no peeling | blistering and peeling not observed |
| Example 5.3 | no peeling | blistering and peeling not observed |
| Example 5.4 | no peeling | blistering and peeling not observed |
| Example 5.5 | no peeling | blistering of 5% of the surface |
| Example 5.6 | no peeling | blistering and peeling not observed |
| Example 5.7 | no peeling | blistering and peeling not observed |
| Example 5.8 | no peeling | blistering of 5% of the surface |
| Comparative Example 4 | no peeling | blistering of entire surface |
| Comparative Example 5 | no peeling | blistering and cracking in areas |
| Comparative Example 6 | no peeling | blistering of entire surface |
| Comparative Example 7 | peeling in areas | blistering of entire surface |

As is shown by the results of the examples and the comparative examples, the adhesiveness between the coating layer and the metal substrate is excellent in the resin-coated metal substrate of this invention, and when the coated metal substrate come into contact with hot water or steam, peeling, blistering, and cracking of the coated resin did not occur. When the coated metal substrate in which the coating layer does not contain inorganic filler and when the coated metal substrate with the undercoating layer comprising aluminium and ethyl silicate condensate or the coated metal substrate treated by arc spray coating comes into contact with steam of high temperature, partial blistering or peeling of the coated resin will occur. However, the coating layer has acceptable water resistance at high temperatures.

On the other hand, when the coated metal substrate with the coating layer comprising either polyaryletherketone resin or polyarylethersulfone resin alone comes into contact with hot water or steam, peeling, blistering, and cracking of the coated resin will occur easily.

It is understood that various other modifications will be apparent to and can be readily made by those skilled in the art without departing from the scope and spirit of this invention. Accordingly, it is not intended that the scope of the claims appended hereto be limited to the description as set forth herein, but that the claims be construed as encompassing all the features of patentable novelty that reside in the present invention including all features that would be treated as equivalents thereof by those skilled in the art to which this invention pertains.

What is claimed is:

1. A metal substrate coated with a resin composition comprising the following components (a) and (b):
   (a) at least one resin selected from the group consisting of a polyaryletherketone resin with a repeating unit of the following formula I, a polyaryletherketone resin with a repeating unit of the following formula II, and a polyphenylene sulfide resin with a repeating unit of the following formula III:

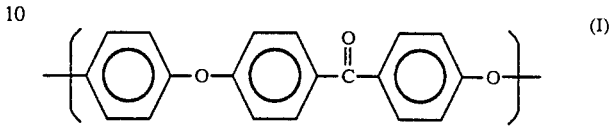

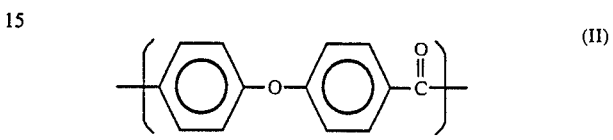

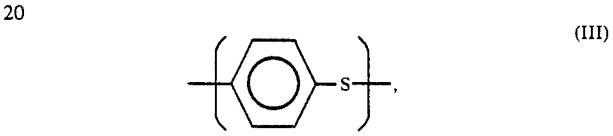

and
   (b) at least one resin selected from the group consisting of a polyarylethersulfone resin with a repeating unit of the following formula IV and a polyarylethersulfone resin with a repeating unit of the following formula V:

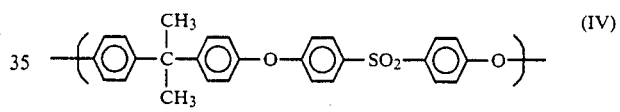

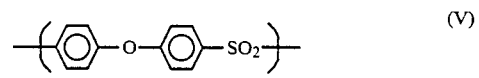

wherein the surface of said metal substrate is first coated with an undercoat composition that comprises said component (a), said component (b), and a thermosetting resin.

2. A metal substrate coated with a resin composition according to claim 1, wherein the ratio of said component (a) to component (b) that are contained in said resin composition is in the range of from 1:9 to 9:1 by weight.

3. A metal substrate coated with a resin composition according to claim 1, wherein said thermosetting resin is at least one selected from the group consisting of imide resins, epoxy resins, phenol resins, and furan resins.

4. A metal substrate coated with a resin composition according to claim 1, wherein the ratio of said component (a) to component (b) that are contained in said undercoat composition is in the range of from 1:9 to 9:1 by weight.

5. A metal substrate coated with a resin composition according to claim 1, wherein the ratio of the total weight of said component (a) and component (b) to said thermosetting resin is in the range of from 1:9 to 9:1 by weight.

6. The metal substrate of claim 3, wherein said thermosetting resin is an imide resin.

7. The metal substrate of claim 6, wherein said imide resin is selected from the group consisting of prepolymers comprising bismaleimide and diamine as polymer units, resin compositions comprising polyfunctional cyanate or a prepolymer of polyfunctional cyanate and amine, and bismaleimide or a prepolymer of bismaleimide and amine, imide prepolymers comprising polyfunctional amine, polyanhydride, or nadic anhydride as polymer units, and resin compositions comprising bismaleimide and alkenylphenol as polymer units.

* * * * *